Patented Sept. 19, 1950

2,523,188

UNITED STATES PATENT OFFICE 2,523,188

ESTERS OF 2,4-DICHLOROPHENOXY-ACETIC ACID

Edgar C. Britton and Louis E. Begin, Midland, Mich., assignors to The Dow Chemical Company, Midland, Mich., a corporation of Delaware No Drawing. Application May 22, 1948, Serial No. 28,734

4 Claims. (Cl. 260—473)

1

The present invention relates to esters of 2,4-dichlorophenoxy-acetic acid and is particularly concerned with compounds having the following formula:

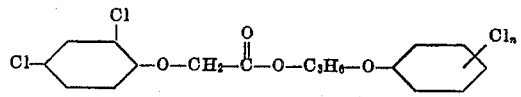

wherein $n$ is an integer not greater than 5. These compounds are adapted to be employed as preservatives for paper, wood, and cellulosic textiles; plant growth control materials; modifiers in plastic compositions; and as intermediates for the preparation of more complex organic derivatives.

The new esters are crystalline solids or oils, somewhat soluble in many organic solvents, and substantially insoluble in water. The compounds are of low volatility, non-corrosive to the skin of man and higher animals, stable to light and air, and not appreciably affected by carbon dioxide.

The ester compounds may be prepared by reacting a molecular proportion of (1) 2,4-dichlorophenoxy-acetic acid and (2) at least a molecular proportion of a chloroaryl mono-ether of propylene glycol, such as monochlorophenoxy-propanol, dichlorophenoxy-propanol, trichlorophenoxy-propanol, tetrachlorophenoxy-propanol, and pentachlorophenoxy-propanol. Better yields are obtained when the water of reaction is removed as formed. The reaction is carried out in the presence of a dehydration catalyst, such as sulphuric acid.

In one method of preparation the catalyst and substantially equimolecular proportions of 2,4-dichlorophenoxy-acetic acid and the glycol ether are dispersed in a water-immiscible solvent, such as ethylene dichloride, and heated together for two hours or longer at the boiling temperature of the mixture. A mixture of the solvent and water of reaction are continuously distilled out of the reaction vessel, condensed, and the solvent recovered. Additional solvent is introduced into the reaction zone as may be necessary. Upon completion of the reaction, the catalyst and unreacted 2,4-dichlorophenoxy-acetic acid are neutralized with an alkali such as dilute aqueous sodium carbonate. The resulting mixture divides into aqueous and solvent layers. The solvent layer is separated and washed several times with water to extract the water-soluble salts of catalyst and unreacted 2,4-dichlorophenoxy-acetic acid. The solvent is then removed by distillation under reduced pressure to obtain the ester.

In an alternative procedure, 2,4-dichlorophenoxy-acetic acid, an excess of the glycol ether, and the catalyst are mixed together and heated for one hour or longer at a temperature of 50° to 60° C. The reaction mixture is then heated under reduced pressure to remove water of reaction together with some of the excess of the glycol ether. Upon completion of the reaction the mixture is diluted with a water-immiscible solvent such as carbon tetrachloride, and neutralized as with dilute aqueous sodium carbonate. The solvent and aqueous layers are separated and the solvent layer washed several times with water to extract the water-soluble salts of catalyst and unreacted 2,4-dichlorophenoxy-acetic acid. The solvent is then removed by distillation at reduced pressure to obtain the ester product.

The propylene glycol chloroaryl ethers employd in these preparations may be obtained by reacting propylene oxide and a chlorophenol in the presence of sodium hydroxide as catalyst. In this reaction, the principal product formed is a 1-chloroaryloxy-2-propanol. In one method of making the compounds, the reactants are mixed and heated together in the presence of the catalyst for ½ hour at a temperature of 170° C. and under a pressure of 200 pounds per square inch. The desired ether-alcohol is then obtained by subjecting the mixed reaction product to fractional distillation under reduced pressure.

The following examples illustrate the invention but are not to be construed as limiting the same:

Example 1

232 grams (1.05 mole) of 2,4-dichlorophenoxy-acetic acid, 184.5 grams (1 mole) of 1-(2-chlorophenoxy)-2-propanol boiling at 272.3° C. at 760 millimeters pressure, 250 milliliters of ethylene dichloride, and 2 milliliters of sulphuric acid were heated together for 2 hours at a temperature of 100° to 130° C. The operation was carried out with constant distillation of ethylene dichloride together with the water of reaction as formed, separation of the water, and recycling of the ethylene dichloride. The reaction mixture was then neutralized with dilute aqueous sodium carbonate. The solvent and aqueous layers were separated and the solvent layer washed several times with water to extract the water-soluble salts of catalyst and unreacted 2,4-dichlorophenoxy-acetic acid. The ethylene dichloride was then removed by distillation at reduced pressure to obtain the 1-(2-chlorophenoxy)-2-propyl ester of 2,4-dichlorophenoxy-acetic acid. This product was a crystalline solid having a melting point of 65° to 65.5° C. and a chlorine content of 27 per cent as compared to the theoretical chlorine content for $C_{17}H_{15}Cl_3O_4$ of 27.4 per cent.

*Example 2*

442 grams (2 moles) of 2,4-dichlorophenoxy-acetic acid, 442 grams (2 moles) of 1-(2,4-dichlorophenoxy)-2-propanol boiling at 297.7° C. at 760 millimeters pressure, 200 milliliters of ethylene dichloride, and 2 milliliters of sulphuric acid were reacted together by the method of Example 1 to obtain the 1-(2,4-dichlorophenoxy)-2-propyl ester of 2,4-dichlorophenoxy-acetic acid. This product was a crystalline solid having a melting point of 60.5° to 61.5° C. and a chlorine content of 33.3 per cent. The theoretical chlorine content for $C_{17}H_{14}Cl_4O_4$ is 33.5 per cent.

*Example 3*

The 1-(2,4,6-trichlorophenoxy)-2-propyl ester of 2,4-dichlorophenoxy-acetic acid was prepared from 2,4-dichlorophenoxy-acetic acid and 1-(2,4,6-trichlorophenoxy)-2-propanol boiling at 118° C. at 1.0 millimeters pressure by the method of Example 1. This ester was a crystalline solid having a melting point of 66° to 68° C. and a chlorine content of 37.7 per cent as compared to the theoretical chlorine content for $C_{17}H_{13}Cl_5O_4$ of 38.6 per cent.

*Example 4*

The 1-(2,4,5-trichlorophenoxy)-2-propyl ester of 2,4-dichlorophenoxy-acetic acid was prepared from 2,4-dichlorophenoxy-acetic acid and 1-(2,4,5-trichlorophenoxy)-2-propanol boiling at 140° C. at 0.8 millimeters pressure, by the method of Example 1. This ester was a crystalline solid having a melting point of 85.5° to 86.5° C. and a chlorine content of 38.4 per cent. The theoretical chlorine content for $C_{17}H_{13}Cl_5O_4$ is 38.6 per cent.

We claim:

1. The esters of 2,4-dichlorophenoxy-acetic acid having the formula:

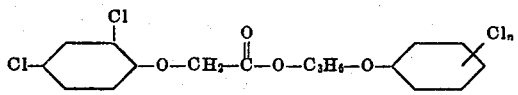

wherein n is an integer not greater than 5.

2. The 1-(2-chlorophenoxy)-2-propyl ester of 2,4-dichlorophenoxy-acetic acid.

3. The 1-(2,4-dichlorophenoxy)-2-propyl ester of 2,4-dichlorophenoxy-acetic acid.

4. The 1-(2,4,5-trichlorophenoxy)-2-propyl ester of 2,4-dichlorophenoxy-acetic acid.

EDGAR C. BRITTON.
LOUIS E. BEGIN.

REFERENCES CITED

The following references are of record in the file of this patent:

UNITED STATES PATENTS

| Number | Name | Date |
|---|---|---|
| 2,142,126 | Grether | Jan. 3, 1939 |
| 2,166,557 | Stoesser et al. | July 18, 1939 |
| 2,322,760 | Lontz | June 29, 1943 |
| 2,396,513 | Jones | Mar. 12, 1946 |